US007626485B2

(12) United States Patent
Sartor

(10) Patent No.: US 7,626,485 B2

(45) Date of Patent: Dec. 1, 2009

(54) BIMETALLIC THERMOSTAT WITH EXCHANGE CONTACT WITH PRINTED CIRCUIT INTERPOSED BETWEEN A SENSITIVE THERMOSTATIC ELEMENT AND AN EXCHANGE RELAY

(75) Inventor: Adriana Sartor, Milan (IT)

(73) Assignee: Elettrotec S.R.L., Milan (IT)

( * ) Notice: Subject to any disclaimer, the term of this patent is extended or adjusted under 35 U.S.C. 154(b) by 203 days.

(21) Appl. No.: 10/599,852

(22) PCT Filed: Apr. 11, 2005

(86) PCT No.: PCT/EP2005/051592

§ 371 (c)(1),
(2), (4) Date: Oct. 11, 2006

(87) PCT Pub. No.: WO2005/104157

PCT Pub. Date: Nov. 3, 2005

(65) Prior Publication Data

US 2007/0216513 A1 Sep. 20, 2007

(30) Foreign Application Priority Data

Apr. 27, 2004 (IT) ........................ MI20040189 U

(51) Int. Cl.
*H01H 37/52* (2006.01)
*H02B 1/26* (2006.01)
*H01H 69/02* (2006.01)

(52) U.S. Cl. ....................... 337/381; 337/380; 337/373; 337/337; 337/334; 361/626; 29/623

(58) Field of Classification Search ................. 337/333, 337/337, 334, 380–381, 373; 361/626; 29/623
See application file for complete search history.

(56) References Cited

U.S. PATENT DOCUMENTS

| | | | | | |
|---|---|---|---|---|---|
| 1,809,305 | A | * | 6/1931 | Matthews | 337/368 |
| 2,475,300 | A | | 7/1949 | Webb | |
| 2,759,066 | A | * | 8/1956 | Short et al. | 337/364 |
| 3,234,350 | A | * | 2/1966 | Johnson et al. | 337/364 |
| 3,728,659 | A | * | 4/1973 | Brock | 337/315 |
| 4,103,271 | A | * | 7/1978 | Taylor et al. | 337/372 |
| 4,306,210 | A | | 12/1981 | Saur | |
| 4,492,946 | A | * | 1/1985 | Loescher | 337/365 |
| 4,533,894 | A | * | 8/1985 | Bishop et al. | 337/107 |
| 4,567,458 | A | * | 1/1986 | Englund | 337/365 |
| 4,591,820 | A | * | 5/1986 | Ruszczyk et al. | 337/107 |
| 4,628,295 | A | * | 12/1986 | Yasuda et al. | 337/354 |
| 4,646,051 | A | * | 2/1987 | Ruszczyk et al. | 337/107 |
| 4,754,251 | A | * | 6/1988 | Ting et al. | 337/107 |
| 4,794,364 | A | * | 12/1988 | Uehara | 337/354 |

(Continued)

*Primary Examiner*—Jayprakash N Gandhi
*Assistant Examiner*—Bradley H Thomas
(74) *Attorney, Agent, or Firm*—Novak Druce + Quigg; J. Rodman Steele, Jr.; Gregory M. Lefkowitz

(57) ABSTRACT

A bimetallic thermostat with exchange contact is described comprising an external support covering (1) and an internal device (2) made up of a pierced base (3) provided with a packing (4) and with electric contacts (5, 15, 25, 35) with the outside, of a relay (8) electrically connected with said base (3) and of a sensitive thermostatic element (9) electrically connected with said relay (8). Said thermostat comprises in addition a printed circuit (7) interposed between the sensing element (9) and the relay (8).

3 Claims, 4 Drawing Sheets

U.S. PATENT DOCUMENTS 4,842,419 A * 6/1989 Nietert ........................ 374/145
4,843,364 A * 6/1989 Place et al. ................. 337/333
4,851,807 A * 7/1989 Holden et al. ............... 337/343
4,887,062 A * 12/1989 Bletz .......................... 337/299
5,046,156 A 9/1991 Hofsass
5,576,683 A * 11/1996 Rose .......................... 337/333
5,660,473 A * 8/1997 Noma et al. ................ 374/145
6,597,274 B1 * 7/2003 Nguyen ...................... 337/377
6,642,460 B2 * 11/2003 Dunne et al. ............. 200/51.03
6,737,952 B2 * 5/2004 Morin et al. ................ 337/300
6,833,782 B2 * 12/2004 Nguyen ...................... 337/377

* cited by examiner

BIMETALLIC THERMOSTAT WITH EXCHANGE CONTACT WITH PRINTED CIRCUIT INTERPOSED BETWEEN A SENSITIVE THERMOSTATIC ELEMENT AND AN EXCHANGE RELAY

FIELD OF THE INVENTION

The present invention concerns a bimetallic thermostat with exchange contacts, with a printed circuit interposed between a sensitive thermostatic element and an exchange relay.

BACKGROUND OF THE INVENTION

Bimetallic thermostats are known comprising an external covering which supports an internal device made up of a base provided with packing which supports contact feet which allow the connection with external devices, an exchange relay connected with the base by means of electric wires and a sensitive thermostatic element connected in turn with said relay by means of contact feet.

The space present between the external covering and the internal device is generally occupied by insulating resin in order to prevent the feet of the thermostat from touching the projecting wires of the relay.

What follows is that the manufacture of a thermostat as described above is rather complex and expensive In addition in the case of breakdown the repair turns out to be difficult if not impossible; the entire thermostat must often be replaced.

BRIEF SUMMARY OF THE INVENTION

An object of the present invention is to provide a thermostat which remains internally simple but which is utilisable without having “to drown” the internal part into an insulating material.

According to the invention such object is attained with a bimetallic thermostat with exchange contacts, comprising an external support covering and an internal device made up of a pierced base provided with a packing and electric contacts with the outside, a relay electrically connected with said base, and a sensitive thermostatic element electrically connected with said relay, and a printed circuit interposed between the sensing element and the relay.

The printed circuit is easy to make, is interchangeable and does not involve the use of filling insulating material in the space comprised between the external covering and the internal device. At the same time it prevents the direct contact between the feet of the sensing element and the electric wires of connection of the relay.

DETAILED DESCRIPTION OF THE DRAWINGS

The characteristics and the advantages of the present invention will become evident from the following detailed description an embodiment thereof which is illustrated as a non limiting example in the enclosed drawings in which.

DETAILED DESCRIPTION OF THE INVENTION

Figure 1:
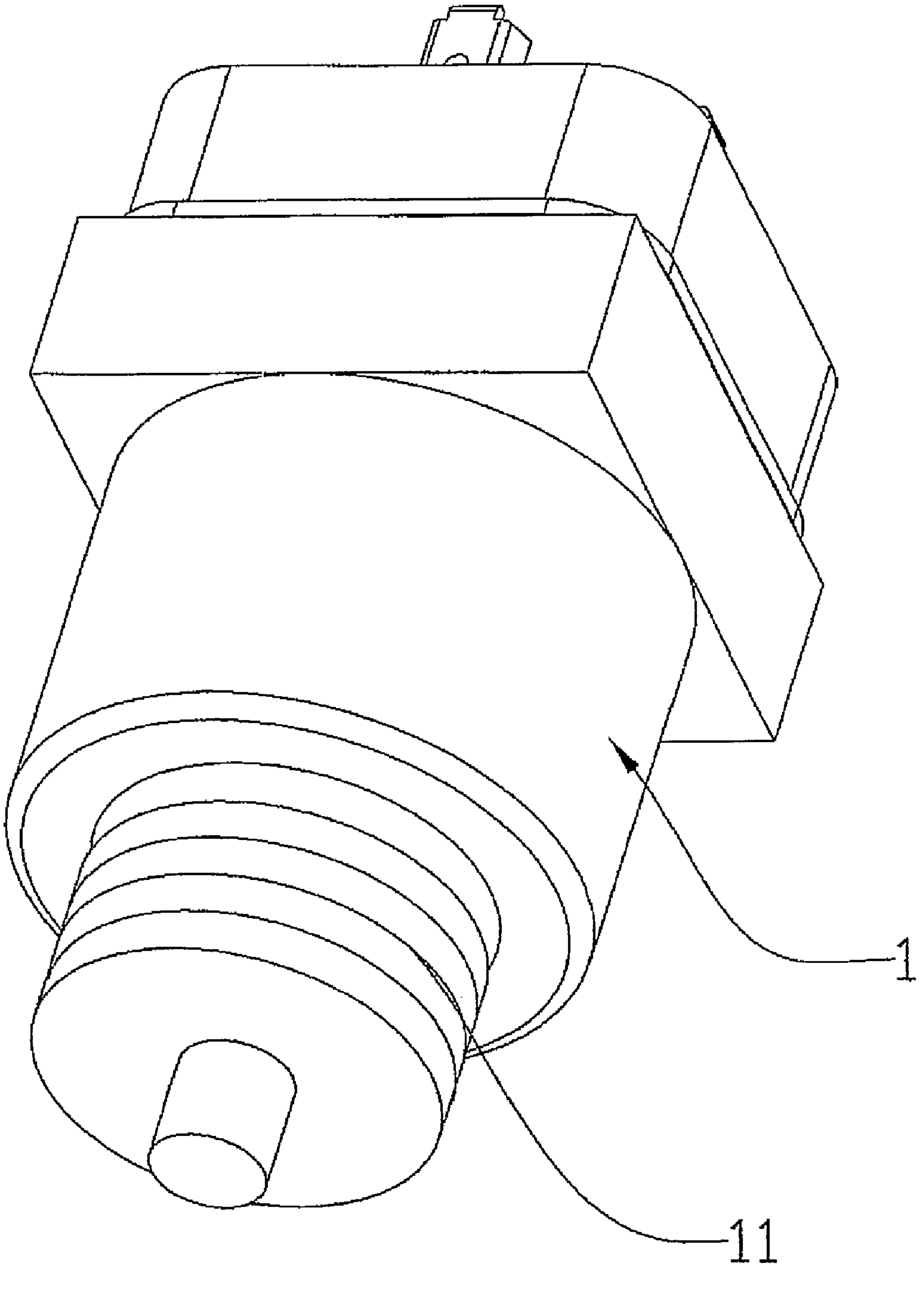
FIG. 1 shows an axonometry view of the thermostat according to the present invention.
Figure 2:
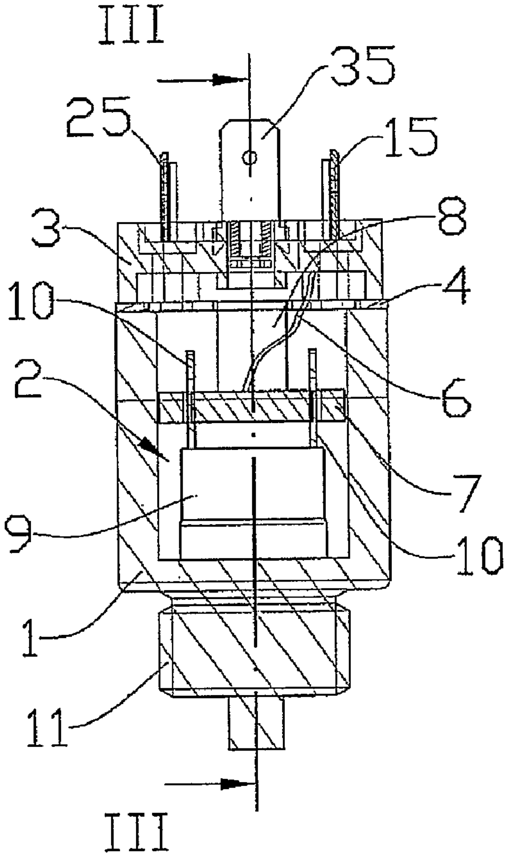
FIG. 2 shows a side sectional view of the thermostat.
Figure 3:
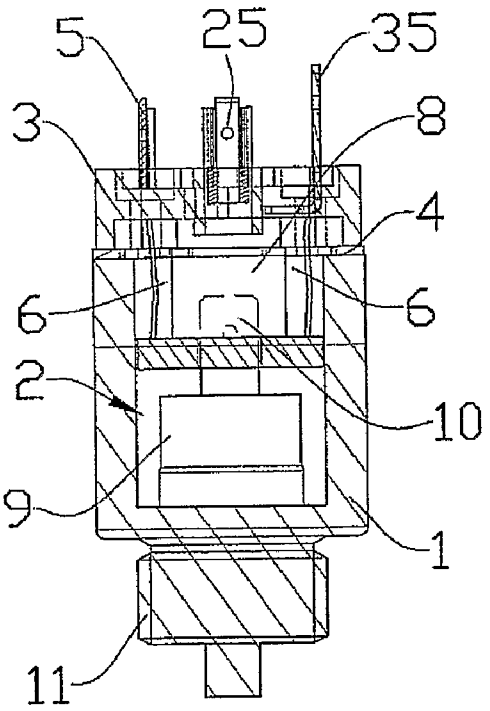
FIG. 3 shows a sectional view according to the line III-III of FIG. 2.
Figure 4:
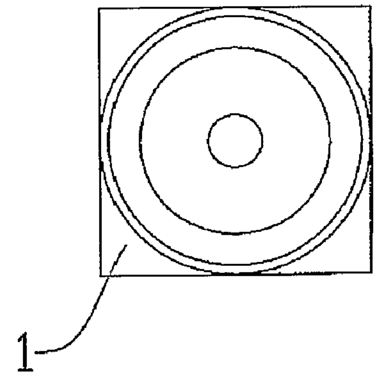
FIG. 4 shows a bottom plan view of the thermostat.
Figure 5:
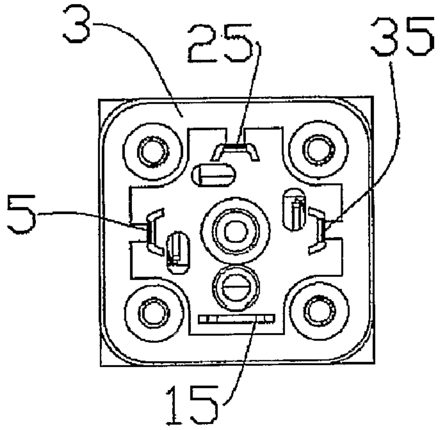
FIG. 5 shows a top plan view of the thermostat.
Figure 6:
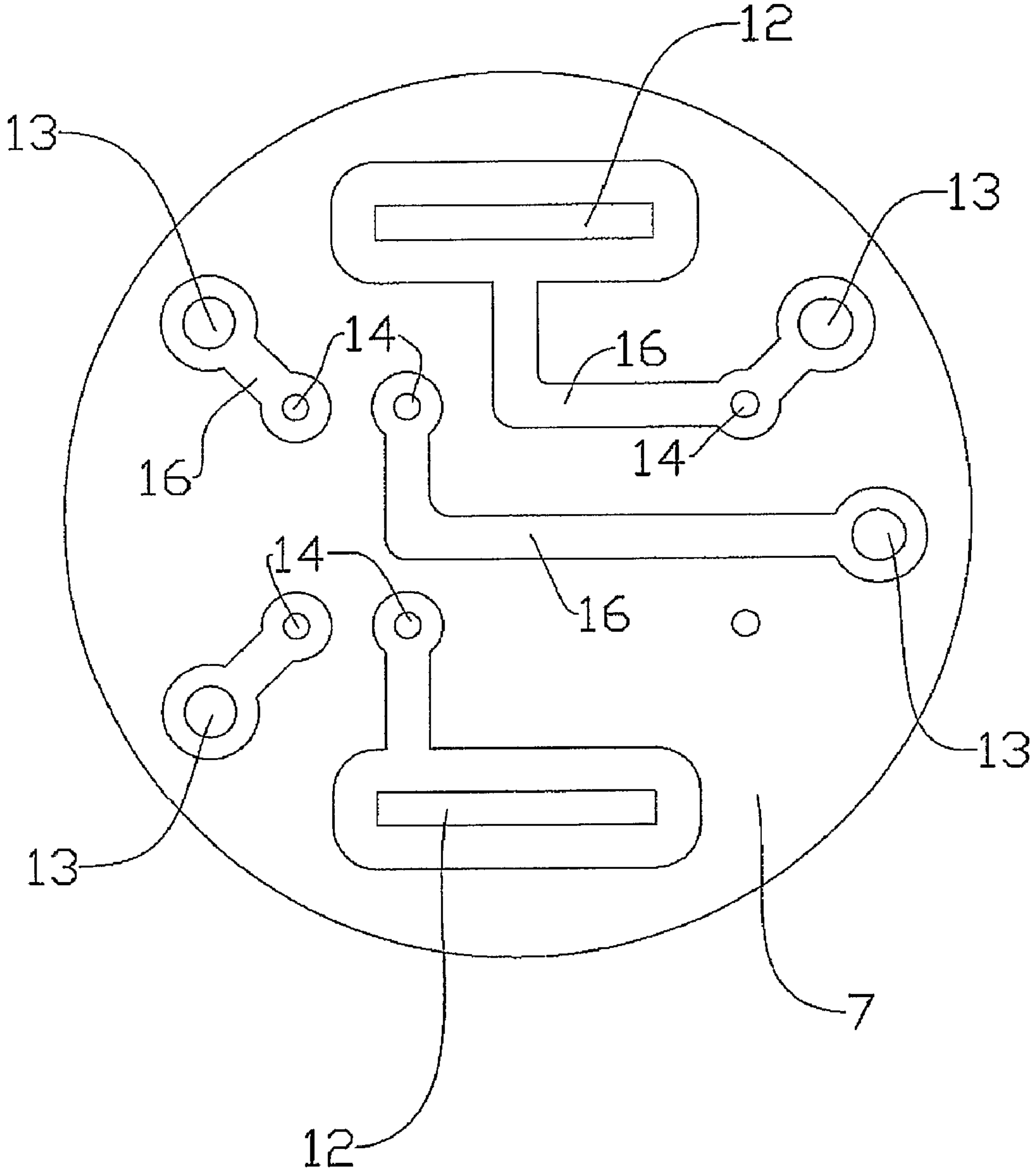
FIG. 6 shows a bottom plan view of the plate.

A bimetallic thermostat comprises an external covering 1 with male thread 11, which supports an internal device 2 made up of a pierced base 3, provided with a packing 4, which supports electric connection external feet 5, 15, 25, 35, which are connected with a printed circuit insulating board 7 by means of electric wires 6.

A relay 8 is fastened to said printed circuit 7, with which a sensitive thermostatic element 9 is electrically connected by means of feet 10.

The printed circuit 7 has on one of its faces two slots 12, in order to house the feet 10, and holes 13 for the ends of the wires 6. In addition it has holes 14 for the fastening of the relay 8 and printed circuit routes 16.

The printed circuit 7 allows the prevention of interferences between the feet 10 of the sensing element 9 and the wires adjacent the relay 8, a situation which could create the short circuit of the relay or in any case the incorrect operation of the same relay 8 with consequent wrong output signals through the external feet 5.

This solution allows an easy assemblage of the thermostat which is as a result without any filling insulating material.

In addition any possible technical problem can be solved owing to the easy disassembly: substitution of the relay 8 or sensing element 9, contacts which fail, etc. There is therefore a certain interchangeability of the elements.

The reduction of manufacturing times together with the simplicity of the device justifies a substantial reduction in costs.

Figure 7:
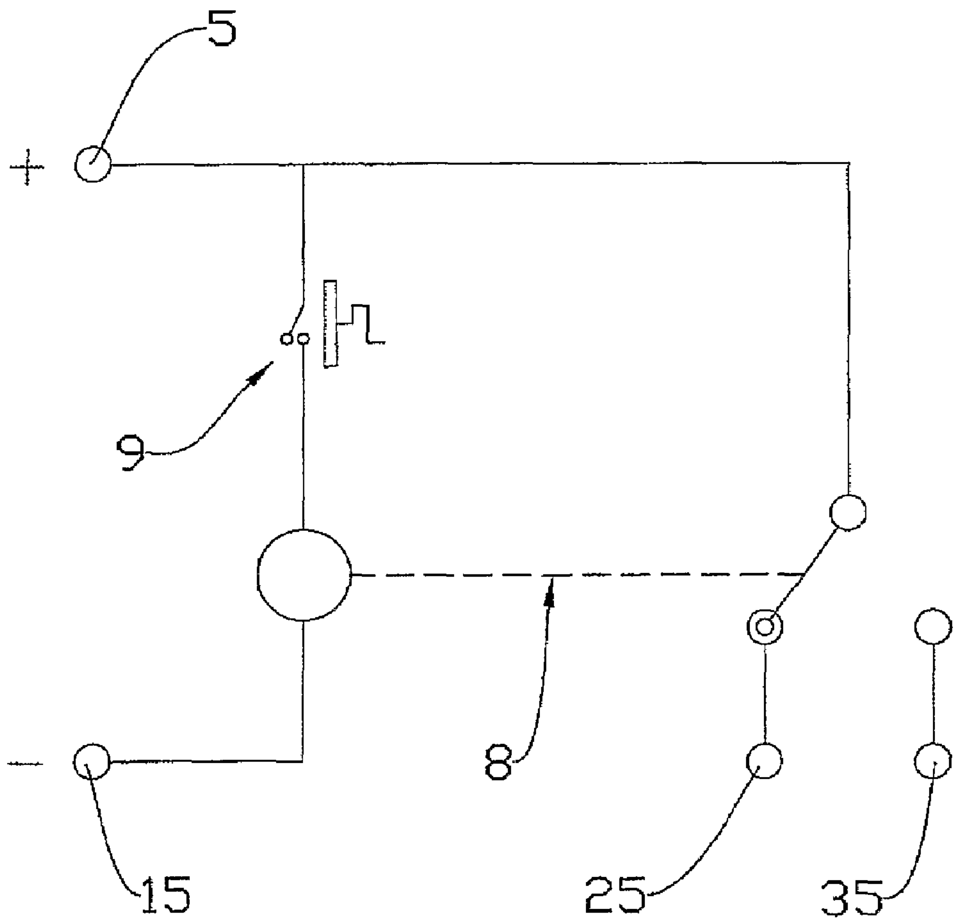
FIG. 7 shows the electric layout of the thermostat according to the invention.

In FIG. 7 the electric layout of the above described thermostat is illustrated, where 5 and 15 are the feeding feet, 25 is the output foot in the operation with normally closed contact and 35 is the output foot in the operation with normally open contact, where the two feet 25 and 35 are selected alternatively as a function of the excitation state or, non-excitation state of the relay 8, in turn function of sensing element 9.

The invention claimed is:

1. A bimetallic thermostat with exchange contacts comprising:

an external support covering; and an internal device comprising:

a pierced base provided with a packing and with electric contacts on one side for electric connection with the outside of the bimetallic thermostat, wires electrically connected with said electric contacts and extending from an opposite side of said base;

a relay arranged at said opposite side of the base and electrically connected with said base, a sensitive thermostatic element provided with feet permanently electrically connected with said relay, an insulating plate physically interposed between the relay and the sensitive thermostatic element, a printed circuit provided on one face of said insulating plate and comprising passing-through slots for housing the feet of the sensitive thermostatic element, first holes for receiving ends of said wires opposite to said electric contacts, second holes for fastening of the relay, first routes for electrically connecting said first holes with said second holes and second routes for electrically connecting said second holes with said slots while maintaining electrically separated said slots and said first holes so that the insulating plate prevents electrical interferences between said feet of the sensitive thermostatic element and said wires.

2. The bimetallic thermostat according to claim 1, wherein said external covering is partially provided with an external connection thread.

3. The bimetallic thermostat according to claim 1, wherein the relay is fastened to said circuit insulating plate.

* * * * *